Feb. 1, 1966 J. KASPAR 3,233,228

PLANAR-HALL DEVICE

Filed July 10, 1961 3 Sheets-Sheet 1

INVENTOR.
JOSEF KASPAR

BY Ernest L. Brown

ATTORNEY

Feb. 1, 1966 J. KASPAR 3,233,228

PLANAR-HALL DEVICE

Filed July 10, 1961 3 Sheets-Sheet 2

INVENTOR.
JOSEF KASPAR
BY
Ernest L. Brown
ATTORNEY

Feb. 1, 1966 J. KASPAR 3,233,228

PLANAR-HALL DEVICE

Filed July 10, 1961 3 Sheets-Sheet 3

INVENTOR.
JOSEF KASPAR

BY

Ernest L. Brown

ATTORNEY

United States Patent Office 3,233,228
Patented Feb. 1, 1966

3,233,228
PLANAR-HALL DEVICE
Josef Kaspar, Sherman Oaks, Calif., assignor to North American Aviation, Inc.
Filed July 10, 1961, Ser. No. 122,789
13 Claims. (Cl. 340—174)

This invention pertains to a device which is adapted to utilize the electromagnetic properties of thin films of conductive ferro-magnetic material as a storage device or as a gate.

The knowledge of the position of the magnetization vector in a magnetic material and its change by external means has been of considerable interest, particularly in the field of logical design of computers. Most notable has been the use of magnetic materials in memory functions. Commonly, the information is extracted by a transient induction process which is caused by a magnetic flux change. In the majority of memories the information is destroyed when the information is extracted.

The device used in this invention uses galvanomagnetic effects which are dependent on magnetic flux directly and not on its rate of change.

A galvanomagnetic effect in semiconductor thin films is described by C. Goldberg and R. E. Davis, in the Physical Review, volume 94, page 1121 (1954). Goldberg and Davis called their discovery a planar Hall effect because the applied magnetic field, the current flowing through the material, and the generated Hall field lie all in the same plane; whereas—in prior Hall-effect devices—the magnetic field, the current flowing through the material, and the generated Hall field were all mutually orthogonal.

It has been predicted by Madelung in the Encyclopedia of Physics, volume 20, page 76 (1957) that such an effect should not exist in metals.

The invention described and claimed herein is based upon the discovery that such a planar Hall effect can be produced in conductive ferro-magnetic materials with an applied magnetic field of only a few oersteds, even when this field is completely parallel to the current flow in the film. Further, the planar Hall effect can be made bistable in ferro-magnetic films under certain operating conditions. The polarity of the planar Hall voltage indicates the direction of internal magnetization of the thin film. The direction of internal magnetization of the thin film can be controlled by applying controlled magnetic fields in the easy direction of magnetization of the ferro-magnetic film.

The device of this invention makes use of the strong internal magnetization of ferro-magnetic materials for the generation of a Hall field and employs a weak external field to rotate the direction of the internal magnetization to generate a Hall voltage which is a measure of the direction of the internal magnetization.

It is therefore an object of this invention to demonstrate that a planar Hall effect in conductive ferro-magnetic thin films, in which the direction of internal magnetization of the film can be controlled, can be used for readout in a storage or gating element.

It is another object of this invention to store and readout digital information.

It is also an object of this invention to use the planar Hall effect in conductive ferro-magnetic materials for a "or" gate.

It is also an object of this invention to use the planar Hall effect in conductive ferro-magnetic materials for an "and" gate.

It is a more particular object of this invention to utilize a conductive ferro-magnetic film, together with appropriate means for applying magnetic fields in the plane of said film in the easy direction of magnetization and in the hard direction of magnetization and to channel current through said film from one side to the other in one direction to generate a voltage across said film and perpendicular to the current flow.

It is also a specific object of this invention to provide apparatus which is designed to achieve the above named objects.

Other objects will become apparent from the following description taken in connection with the accompanying drawings in which.

Figure 1:
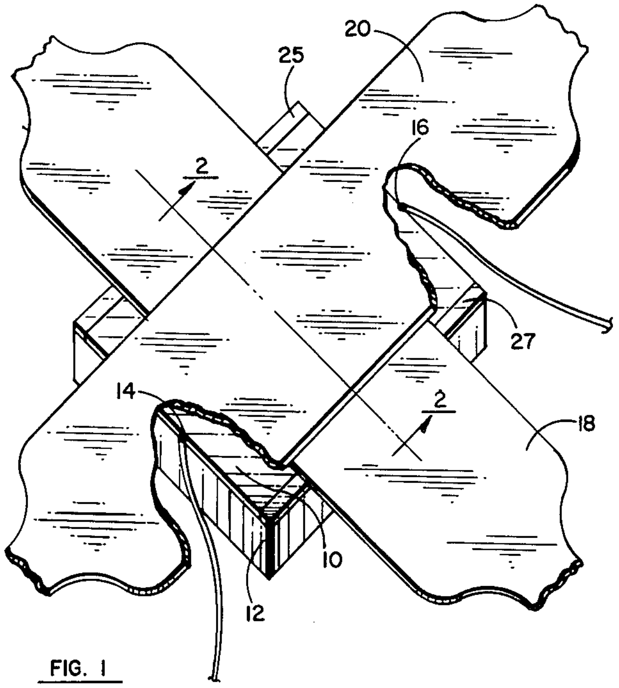
FIG. 1 is an oblique view of a conductive ferro-magnetic film used in this invention and a pair of flat current-conducting ribbons adapted to generate crossed magnetic fields.
Figure 2:
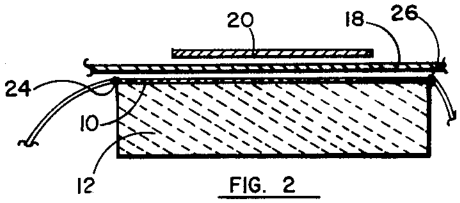
FIG. 2 is a sectional view taken at 2—2 in FIG. 1.

In FIGS. 1 and 2, a thin film of conductive ferro-magnetic material 10 such as—for example—Permalloy, which is an alloy of approximately 20% iron and 80% nickel is supported by substrate 12. Such alloys, despite their metallic character, are likely to have carriers with distinctively different mobilities or exhibit anisotropy in their electronic behavior which adapts them to generate a voltage in the presence of a current flow and a magnetic field.

The dielectric material 12 may, for example, be soft glass. Instead of dielectric material 12, a metallic conductor with a thin film of insulating material could be used.

The direction of the internal magnetization of film 10 with no applied external magnetic field is described herein as the easy direction of magnetization. A direction in the plane of film 10 and perpendicular to the easy direction of magnetization is described as the hard direction of magnetization of the material.

A pair of electrodes 14 and 16 are connected to opposite sides of film 10 parallel to the easy direction of magnetization. As an alternative the direction between electrodes 14 and 16 may be in the hard direction of magnetization of film 10 (not shown in this configuration).

Terminals 14 and 16 could be positioned apart less than the entire distance across film 10. The wider the spacing between terminals 14 and 16, the higher the output voltage.

A second pair of electrodes 24 and 26 are connected to opposite sides of film 10 across a direction perpendicular to the axis between electrodes 14 and 16.

Current is channeled through film 10 opposing electrodes 24 and 26. An output voltage can be made to appear at the other pair of terminals 14 and 16. The terminals are preferably connected to a pair of current distributing strips 25 and 27 to insure that current flows through film 10 with only a component perpendicular to the axis between terminals 14 and 16.

The device of this invention may be utilized as a nondestructive readout storage member. A flat ribbon of conductive material 18 is adapted to receive current to generate a magnetic field in the plane of film 10 in the easy direction of magnetization. The polarity of the magnetic field generated by current flow through ribbon 18 depends upon the direction of current flow.

A second flat ribbon 20 is positioned to carry current perpendicular to the current carried in ribbon 18 to generate a magnetic field in the plane of film 10 in the hard direction of magnetization to be used to rotate the internal magnetization.

Ribbons 18 and 20 are preferably wider than film 10 to insure uniform magnetic fields in the plane of film 10. They are shown narrower to simplify the drawings.

Other means for generating uniform magnetic fields in film 10 may be used. Conductive ribbons 18 and 20 are shown by way of example only.

In a typical example which was tested, film 10 had a thickness of a thousand angstroms and was two millimeters square. As indicated in the first cited publication, planar Hall electric field generated in this invention depends upon the product of the magnetization components in the hard and easy directions and the current density within film 10. Thus, with a constant current, the output voltage between terminals 14 and 16 increases as film 10 is made thinner.

Figure 3:
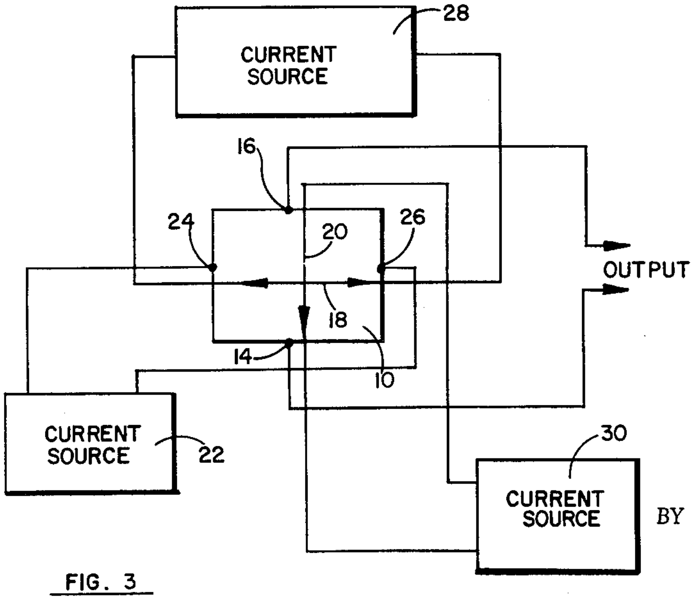
FIG. 3 is a block diagram of the electrical portion of a typical embodiment of this invention.

Referring to FIG. 3, a current source 22 is connected to terminals 24 and 26 to channel current through film 10. In a typical device which was tested, the current flow from current source 22 was about 100 milliamperes.

In one embodiment current source 28 is adapted to supply current of one direction or the other through flat ribbon 18 to switch the direction of the internal magnetization within film 10 along the axis of the easy direction is controlled by a field H of the order of two or three oersteds, is of the order of 8,000 gauss.

Current source 30 is adapted to supply current in a predetermined direction through ribbon 20 to generate a second magnetic field in the plane of film 10, in the hard direction of magnetization. The magnitude of the applied H field as a result of current from current source 30, in a typical example, is of the order of two to three oersteds.

Figure 4:
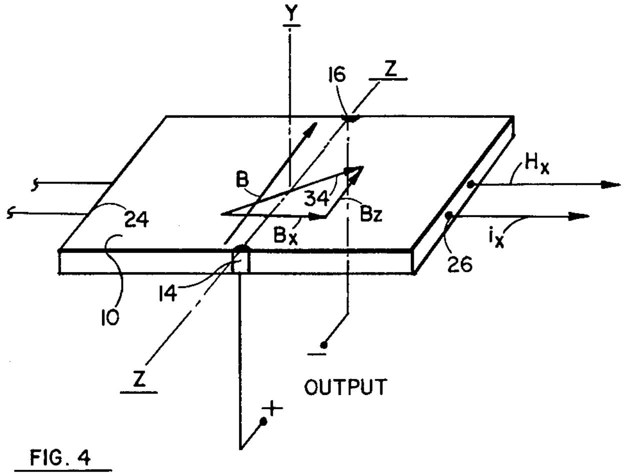
FIG. 4 is a schematic view of a typical thin film used in this invention, together with vectors showing the various magnetic fields, currents, and voltages used in one embodiment of this invention.
Figure 5:
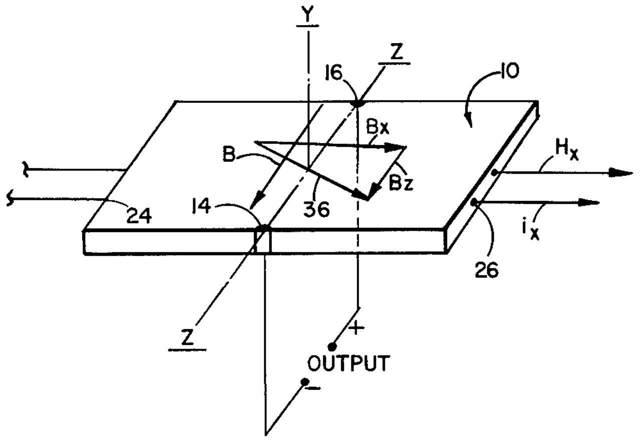
FIG. 5 is a view identical with FIG. 4 with the internal magnetization vector reversed and the output voltage polarity reversed.

Referring to FIGS. 4 and 5, the internal magnetization vector B is oriented either as shown in FIG. 4 or as shown in FIG. 5 along the easy axis of magnetization of the material of film 10 in a direction which is designated as the Z direction. A current $i_x$, applied at terminal 24, is directed by distributing strips 25 and 27, in one direction through ferro-magnetic film 10 and leaves at terminal 26. The direction of flow of current is shown by way of example, in the hard direction of magnetization of the material of film 10. Any generated Hall voltage, when $H_x$ is applied, appears at terminals 14 and 16.

Alternatively current may be applied in the easy direction of magnetization. Then any generated Hall voltage, with $H_x$ applied, appears across terminals aligned with the hard direction of magnetization.

In one mode of operation, current flows continuously from current source 22 through film 10. To store information which designates, for example, a digital "one," a current flow from left to right (FIG. 3) is driven through ribbon 18 which causes the internal magnetization B to be directed in a predetermined direction along the easy axis of magnetization.

To read-out the information which is stored in the conductive ferro-magnetic film 10, a current is channeled from top to bottom (FIG. 3) in ribbon 20 to generate an applied magnetic field designated $H_x$ in FIGS. 4 and 5 to rotate B into direction 34 or 36, having components $B_x$ and $B_z$, within the ferro-magnetic material. Only when both components are present is a planar Hall voltage generated. The voltage between the output terminals 14 and 16 has a polarity which is a measure of the direction of the internal magnetization B. The voltage is proportional to the product of $B_x$ and $B_z$ and changes its sign whenever our component changes its sign. The direction of B shown in FIG. 4 could (for example) represent a "one" and the direction of B shown in FIG. 5 could represent a "zero" whereby an output voltage of the polarity of FIG. 4 would represent a "one" and the output voltage of the polarity of FIG. 5 would represent a zero. Alternatively the V vector FIG. 4 would represent a "zero" and that of FIG. 5 could represent a "one."

When the applied magnetic field $H_x$ is removed, the internal magnetization vector B returns to the easy direction of magnetization.

By limiting the intensity of the applied magnetic field $H_x$, the rotation of B is less than 90 degrees, creating two components of magnetization. The applied magnetic field $H_x$ can be applied continuously to generate a continuous output voltage whose polarity is an indication of a "one" or a "zero." The continuous field may—for example—be applied by a permanent magnet (not shown). Alternatively, magnetic field $H_x$ may be a pulse of short duration to generate an output voltage pulse of short duration whose polarity is a measure of a "one" or a "zero." A third alternative is to maintain the magnetic field $H_x$ constant and to pulse the current which flows through the magnetic film 10. No output voltage occurs when the internal magnetization is parallel or perpendicular to the flow of current through film 10. Thus the device of this invention is used as an "and" gate.

It appears to be most desirable to maintain a constant magnetic field $H_x$. It is to be noted that with constant magnetic field $H_x$ applied in the hard direction of magnetization, the field in the easy direction of magnetization which is required to reverse the direction of the magnetization B is weaker than with no field $H_x$. For example, without a constant applied magnetic field $H_x$ the required applied magnetic field in the weak direction of magnetization to change the polarity of B would be of the order of two or three oersteds. When, however, a constant applied magnetic field $H_x$ is used an applied magnetic field in the weak direction of magnetization in the order of one orested is all that is required to reverse or flip the polarity of B.

With no external field applied in the easy direction of magnetization, a sufficiently intense applied magnetic field in the hard direction of magnetization causes B to rotate 90° into the hard direction of magnetization. If the current which generates the magnetic field $H_x$ is limited to have either a zero value or a magnitude which is sufficient for a 90° rotation, the presence of two applied magnetic fields of the source magnitude, i.e., in both the easy and hard directions of magnetization, would be required to cause the magnetization vector to take the position 34 or 36 thereby to generate an output voltage.

It is to be noted that by reversing the conditions of the gate that any "and" gate becomes an "or" gate. Thus in FIGS. 1 and 3, the absence of signals from either current source 22 or 28 produces a zero. Thus the "and" gate becomes an "or" gate.

Figure 6:
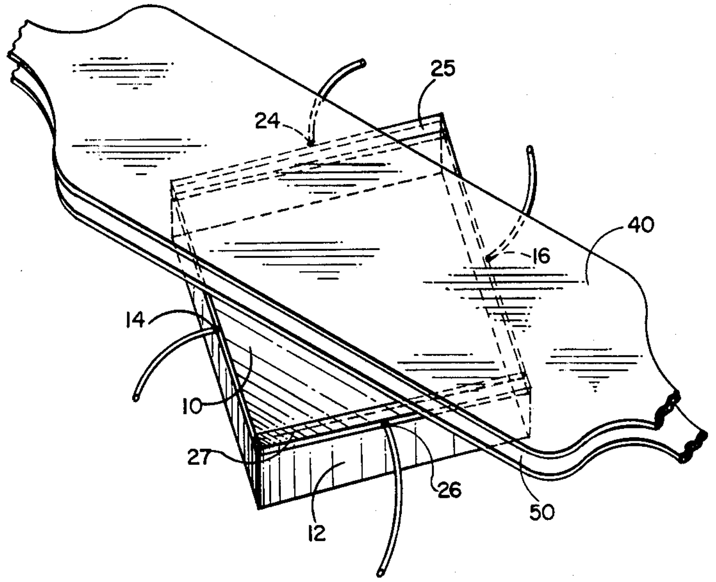
FIG. 6 is an oblique view of a conductive ferro-magnetic film used in this invention, and of a pair of flat current-conducting ribbons adapted to generate parallel magnetic fields.

By turning ribbons 18 and 20 into parallel relation at an angle—for example 45°—between the easy and hard directions of magnetization, as shown at 40 and 50 of FIG. 6, the presence of a sufficiently strong current in either of the ribbons 40 or 50 would cause the internal magnetization to turn into the direction of the magnetic fields of the ribbons thus generating an output voltage between the terminals perpendicular to the current flow in film 10. In such an arrangement the device of this invention is an "or" gate.

It is to be noted that by reversing the conditions of the gate that any "or" gate becomes an "and" gate. Thus in FIG. 6 if currents are zero in both ribbons 40 and 50 there is a "zero" output. The "or" gate becomes an "and" gate.

Figure 7:
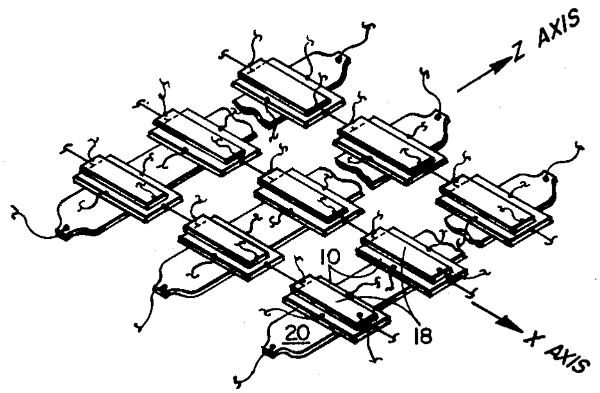
FIG. 7 is an oblique view of a typical matrix adapted to use the device of this invention.

FIG. 7 shows a plurality of devices of this invention arranged in a matrix. It is to be noted that ribbon 20 appears (as an alternative embodiment) in FIG. 7 on the opposite side of film 10 from ribbon 18. Further, the entire matrix of films and conductors could be potted (not shown).

In the interest of clarity, leads are shown on only one device in FIG. 7.

Thus the device of this invention provides a memory function with non-destructable readout. Because the device of this invention does not require an induction or changing flux process to readout the information stored therein, transient events do not effect the results which are measured at the output of the device of this invention.

In order to operate properly as a storage device, the applied field has to be above zero but below the saturation field, for the effect is zero output in both limiting cases. Further, the ideal material should preferably show magnetization reversal by rotation rather than by wall movement.

It is immediately apparent that the device of this invention has use in the computer and electronic arts as a memory storage, as an "or" gate, or as an "and" gate.

Although the device of this invention has been described in detail above it is not intended that the invention should be limited thereby but only in accordance with the spirit and scope of the appended claims.

I claim:

1. In combination: a film of conductive ferromagnetic material which has an easy and a hard direction of magnetization; means for causing a current flow through said film; means for rotating the magnetization of said film in the plane of said film; and means for detecting the direction of rotation of the magnetization of said film.

2. A device as recited in claim 1 in which said current flow has a component only in the hard direction of magnetization of said film.

3. A device as recited in claim 1 in which said current flow has a component only in the easy direction of magnetization of said film.

4. In combination: means for applying a pair of perpendicular magnetic fields in the plane of a conductive ferromagnetic film, said fields having suitable intensities when combined to point the internal magnetization of said film at an angle relative to the individual said fields; means for causing current to flow in said film parallel to one of said fields to cause a planar Hall-effect voltage to be generated in said film along an axis perpendicular to said current flow, the presence of said voltage signifying the simultaneous existence of said applied fields, the absence of said voltage signifying the absence of one or both of said applied fields; and takeoff means for taking off said voltage.

5. In combination: a film of conductive ferromagnetic material; means for causing a current to flow through said film and in the plane of said film; a pair of magnetic field generating means, adapted to generate a field in the plane of said film at a non-perpendicular, non-parallel angle to said current to cause the presence of said applied fields to generate a voltage along an axis perpendicular to said current flow and in the plane of said film; and takeoff means for taking off said voltage.

6. A device as recited in claim 5 in which said current flows in the hard direction of magnetization of said film.

7. A device as recited in claim 5 in which said current flows in the easy direction of magnetization of said film.

8. A planar Hall-effect device comprising in combination: a thin film of conductive ferromagnetic material; said film having an easy direction of magnetization and a hard direction of magnetization perpendicular to said easy direction of magnetization, said easy and hard directions being in the plane of said film; first electromagnetic means adapted to generate a magnetic field in the plane of said film along said easy direction of magnetization, the polarity of said magnetic field selectively representing a state of magnetization; a current source adapted to cause current to flow in one direction through said film in the plane of said film; second electromagnetic means adapted to generate a magnetic field in the plane of said film in said hard direction of magnetization, said last named magnetic field having an intensity which causes the magnetization of said field to have components both parallel and perpendicular to said current flow; a pair of electrodes, positioned on the surface of said film along an axis perpendicular to said current flow, to cause the polarity of the Hall-effect voltage across said electrodes to be a measure of said state of magnetization.

9. A device as recited in claim 8 in which the direction of current through said films is in the hard direction of magnetization of said film.

10. A device as recited in claim 8 in which the direction of flow of current through said film is in the easy direction of magnetization of said film.

11. The combination comprising
a film of magnetized magnetic material;
means for causing a current to flow thru said magnetic film;
means for displacing said magnetization by a given angle whereby a planar Hall-effect voltage is produced indicating said displacement; and
takeoff means for taking off said voltage.

12. The combination comprising
a film of magnetized magnetic material;
means for causing a current to flow thru said magnetic film;
means, comprising an electrical conductor positioned adjacent said film, for producing a magnetic field that rotates said magnetization of said film to produce a planar Hall-effect voltage that indicates the amount and direction of rotation of said magnetization; and
terminal means for taking off a sample of said planar Hall-effect voltage.

13. The combination comprising
a film of magnetic material having an easy-to-magnetize direction and a hard-to-magnetize direction;
means for causing a current to flow thru said magnetic film;
means, comprising a first element capable of conducting an electric current, positioned adjacent said film, for producing, in the plane of said film, a magnetic field that magnetizes said film in its easy-to-magnetize direction;
means, comprising a second element capable of conducting an electric current, positioned adjacent said film at an angle to said first element, for producing, in the plane of said film, a magnetic field that rotates said magnetization—whereby a planar Hall-effect voltage is produced in the plane of the film to indicate the amount and direction of rotation of said magnetization; and
terminal means for taking off a sample of said planar Hall-effect voltage.

References Cited by the Examiner

UNITED STATES PATENTS

| | | | |
|---|---|---|---|
| 3,004,243 | 10/1961 | Rossing et al. | 340—174 |
| 3,030,612 | 4/1962 | Rubens et al. | 340—174 |
| 3,037,199 | 5/1962 | Grant | 340—174 |
| 3,048,829 | 8/1962 | Bradley | 340—174 |
| 3,058,099 | 10/1962 | Williams | 340—174 |

OTHER REFERENCES

Pages 482 to 488, 324–45, April 15, 1959, Publication I, Physical Review, vol. 114, No. 2.

Pages 853 to 876, May 1959, Publication II, Bell System Technical Journal, vol. 38, No. 3.

IRVING L. SRAGOW, *Primary Examiner.*

BERNARD KONICK, *Examiner.*

R. R. HUBBARD, H. D. VOLK, *Assistant Examiners.*